Figure 1:
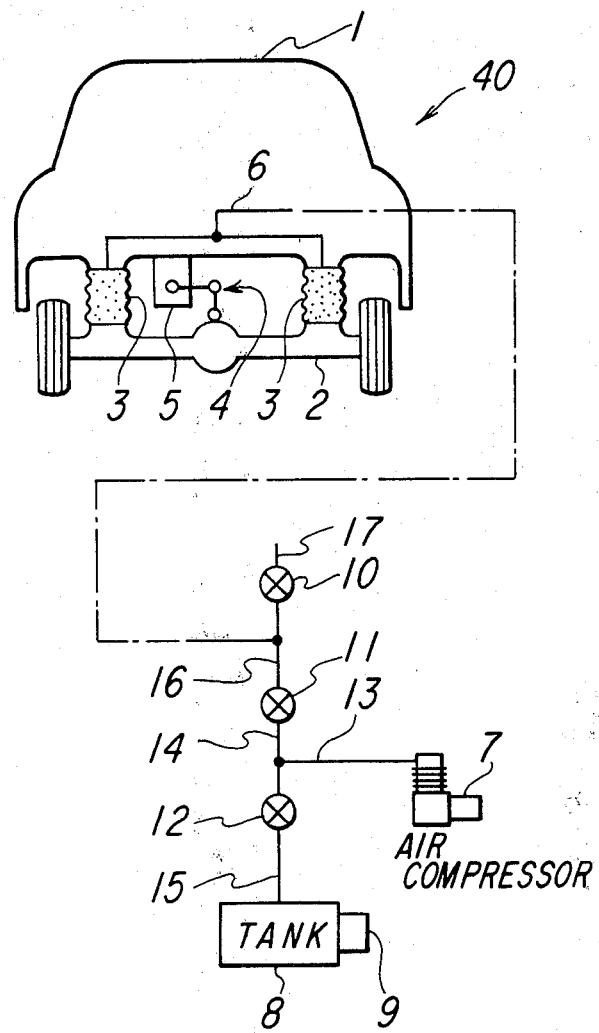

United States Patent [19]

Maeda

[11] 4,390,187
[45] Jun. 28, 1983

[54] VEHICLE LEVELING SYSTEM
[75] Inventor: Koichi Maeda, Kawasaki, Japan
[73] Assignee: Tokico Ltd., Kawasaki, Japan
[21] Appl. No.: 224,740
[22] Filed: Jan. 13, 1981
[30] Foreign Application Priority Data Jan. 18, 1980 [JP]  Japan ................................. 55-4721

[51] Int. Cl.³ ............................................ B60G 17/00
[52] U.S. Cl. ............................. 280/6 R; 267/64.22; 280/707
[58] Field of Search ............... 280/707, 714, 702, 706, 280/6 R; 267/64 R, 65 D, 423, 431

[56] References Cited
U.S. PATENT DOCUMENTS 4,015,859  4/1977  Hegel ................................. 280/707
4,168,840  9/1979  Graham ............................. 280/6 R
4,270,771  6/1981  Fujii ................................... 280/707

OTHER PUBLICATIONS

"A Dry Air, Electronic Controlled Leveling System for Passenger Cars and Light Trucks", Jerry W. Burns, Society of Automotive Engineers, Inc. (1978).

Primary Examiner—Richard A. Bertsch
Attorney, Agent, or Firm—Wegner & Bretschneider

[57] ABSTRACT

A vehicle leveling system is disclosed having an air compressor adapted to issue pressurized air, a tank communicated with the compressor through an electromagnetically operated valve, and a suspension disposed between a chassis and a vehicle axle and having an air chamber to which the tank and the compressor supply the pressurized air through an electromagnetically operated valve.

23 Claims, 2 Drawing Figures

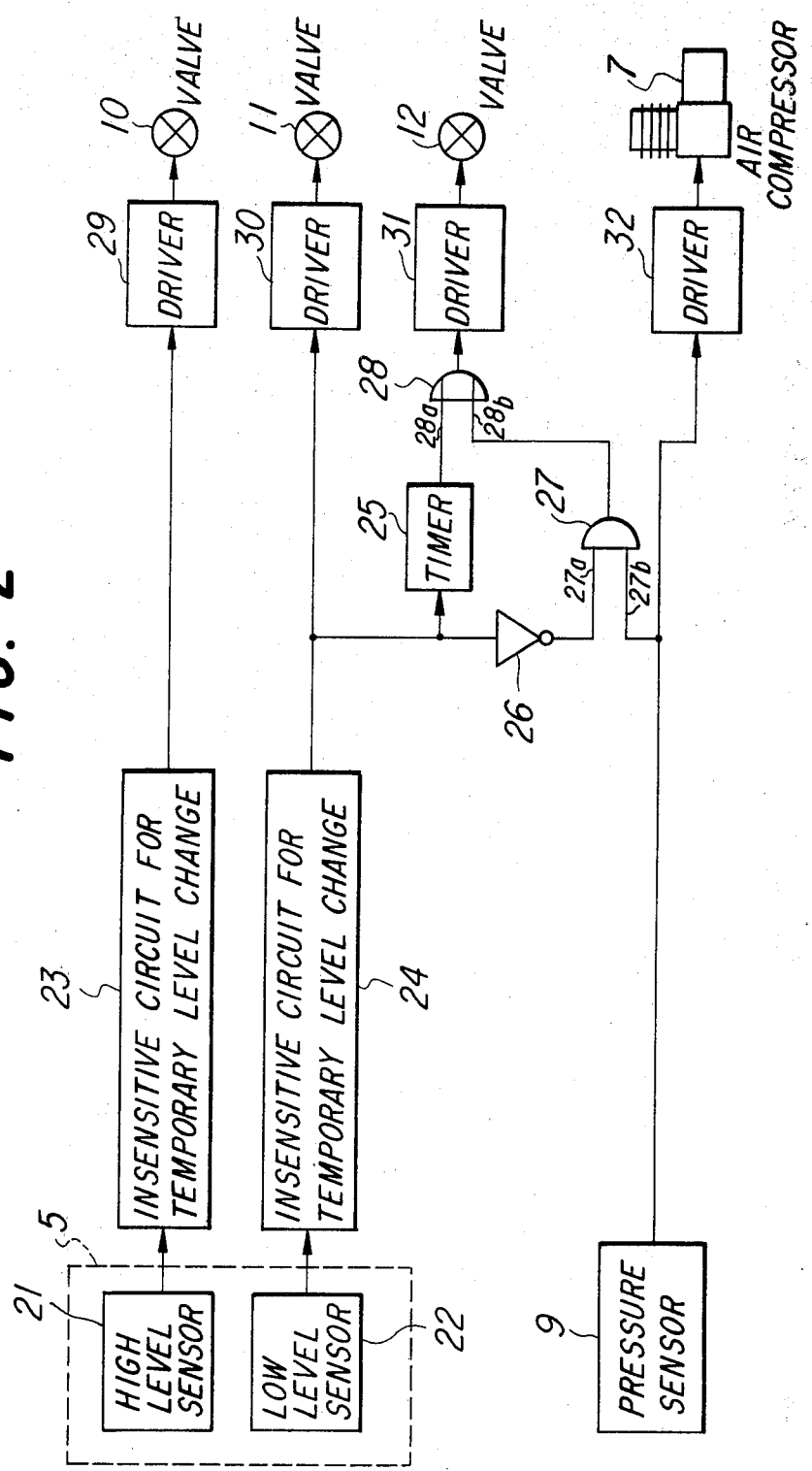

VEHICLE LEVELING SYSTEM

This invention relates to a vehicle leveling system comprising an air receiver for accumulating pressurized air, and adapted to supply pressurized air from the receiver and an air compressor to pneumatic springs when the level of the vehicle height goes lower.

In a vehicle leveling system equipped with such a receiver or a tank, the size of the tank has to be smaller than that of tanks employed in usual compressors since it is practically required that the tank can be mounted on a vehicle, and this requirement is particularly remarkable in usual passenger cars or the like. However, with a tank of small size, that is, of small capacity, it is difficult to elevate the vehicle body or chassis to a predetermined level by the action of pneumatic or air springs caused only from the pressurized air of a preaccumulated volume in the tank if the vehicle is heavily loaded.

In particular, passenger cars or the like, which have a restricted space for mounting the pneumatic spring, require pneumatic springs with smaller effective pressure-receiving area. In this case, the pressure necessary for the pneumatic spring in inevitably increased.

In order to supply the air spring which requires high air pressure only from an air receiver, the pressure in the air receiver has to be much higher than the pressure necessary for the pneumatic spring. However, it is difficult to obtain such a high pressure due to the problems of the performance of the compressor and the like.

In view of the above, a compressor is employed and it is started when the pressure in the tank decreases below a predetermined pressure level to supply pressurized air to the tank and to the pneumatic springs for compensating the insufficient supply of the pressurized air from the tank and elevating the vehicle body to a predetermined level.

However, since the pressurized air is supplied to the tank and to the air springs from the compressor having a limited capacity in this case, it takes too much time for the vehicle body to reach the predetermined level.

This invention intends to overcome the foregoing problems.

In the case where the vehicle height can not restore the predetermined level by the supply of the pressurized air in the tank alone in the vehicle leveling system equipped with a tank, the supply of the pressurized air from the tank to the air spring has almost been completed already within a preceding certain period of time and the pressurized air is scarcely sent from the tank to the air springs after the elapse of the above period. In other words, the tank operates effectively only within a predetermined period of time for the supply of the pressurized air to the air springs.

This invention has been made taking notice of the foregoing fact and it is an object of this invention to provide a vehicle leveling system, in which the communication between the tank and the compressor is interrupted and the pressurized air issued from the compressor is sent only to the air springs after a predetermined period of time has been elapsed from the start of the air supply from the tank to the air springs, thereby enabling the desired vehicle level setting to be completed more rapidly.

This invention provides a vehicle leveling system comprising a compression means for producing pressurized air, means for accumulating the pressurized air produced by the compression means, pneumatic spring means disposed between a chassis and a vehicle axle for setting the distance between the chassis and the vehicle axle by the pressurized air supplied thereto, and means for controlling the supply of the pressurized air so that the pressurized air is supplied from the compression means only to the pneumatic spring means after a predetermined period of time has been elapsed from the start of the air supply from the accumulating means the pressurized air to the pneumatic spring means until the predetermined distance is set between the chassis and the vehicle axle.

This invention further provides a vehicle leveling system comprising a compressor, a receiver for accumulating the pressurized air produced by the compressor and a pneumatic spring disposed between chassis and a vehicle axle, and in which an air conduit from the compressor is connected to an air conduit communicating the receiver with the pneumatic spring, and the pressurized air is supplied from the compressor only to the pneumatic spring after a predetermined period of time has been elapsed from the start of the air supply from the receiver to the pneumatic spring.

The vehicle leveling system according to this invention can significantly shorten the time required for the vehicle level control, for which much time has been taken in the conventional system, in the case where the vehicle is loaded with such heavy goods or passengers that the pneumatic spring can not restore a predetermined level only by way of the pressurized air accumulated in the receiver. This enables the sooner control for the proper vehicle attitude even under heavy loads. Moreover, since the chassis goes rapidly away from the stroke end of the suspension device, abutments of the chassis against the stroke end which have often occured so far upon starting on rugged road and impaired the comfortable riding can be decreased significantly.

This invention is to be explained referring to a preferred embodiment in conjunction with the accompanying drawings, by which the foregoing objects and features, as well as other objects and features of this invention will become more clear, wherein FIG. 1 shows one embodiment of the vehicle leveling system according to this invention; and FIG. 2 shows an electrical control circuit for use with the embodiment shown in FIG. 1.

In FIG. 1, the vehicle body or chassis 1 of a vehicle 40 is supported by pneumatic or air springs 3, 3 disposed between the chassis 1 and a vehicle axle 2. The springs 3, 3 have variable capacitance air chambers respectively, which are disclosed, for example, in U.S. Pat. No. 4,017,099. The air spring 3 sets vehicle level by adjusting the distance between the chassis and the vehicle axle 2, that is, the vehicle height to a predetermined level due to charge and discharge of pressurized air through an air conduit 6 irrespective of the weight of the goods or passengers loaded on the chassis 1.

The charge and discharge of the pressurized air to the air springs 3, 3 are controlled depending on the detection of the vehicle level by a vehicle height sensor 5 mounted to the chassis 1 as detailed later. The vehicle height sensor 5 is connected by way of a link mechanism 4 to the vehicle axle 2 and generates signals when the detecting element of the sensor 5 is actuated by the link mechanism 4. Any type of sensors that comprise a high level detection sensor and a low level detection sensor can be used as the vehicle height sensor 5.

An air compressor 7 mounted on the chassis 1 is communicated with an air conduit 14 through an air conduit 13. The air conduit 14 communicates with a tank or a receiver 8 through an electromagnetically operated valve or a solenoid valve 12 and an air conduit 15, on one hand, communicates with the air conduit 6 leading to the springs 3, 3, through an electromagnetically operated valve or a solenoid valve 12, on the other hand, and further communicates with an external opening 17 leading to the atmosphere through an electromagnetically operated valve or a solenoid valve 10.

A low pressure sensor 9 disposed in the tank 8 generates a signal when the pressure of the pressurized air in the tank 8 goes lower than a predetermined pressure level. Although all of the valves 10, 11 and 12 empolyed in this embodiment are electromagnetically operated valves, they may be replaced with those valves actuated on the pilot pressure.

The vehicle leveling system includes the following control modes:

(i) In the case where the vehicle level is high:

Pressurized air in the springs 3, 3 is led from the air conduit 6 to the air conduit 16 and then discharged through the valve 10 externally from the opening 17 leading to the atomosphere.

(ii) In the case where the vehicle level is low:

(a) Supply of pressurized air from the tank 8;

Pressurized air in the tank 8 is introduced to the air conduit 6 through the air conduit 15, the valve 12, the air conduit 14, the valve 11 and the air conduit 16 and then supplied to the springs 3, 3.

(b) Supply of pressurized air from the compressor;

The pressurized air produced from the compressor 7 is introduced to the air conduit 6 through the air conduit 13, 14, the valve 11 and the air conduit 16 and then supplied to the springs 3, 3.

Supply of air in the operation (a) and (b) is conducted simultaneously in a specified period as detailed later.

(iii) Charging of pressurized air to the tank:

The pressurized air produced from the compressor 7 is introduced to the air conduit 15 through the air conduit 13, 14 and the valve 12, and then charged to the tank 8.

The foregoing operations are executed, for example by a control circuit as shown in FIG. 2.

The vehicle height sensor 5 incorporates a high level detection sensor 21 and a low level detection sensor 22 and detects the vehicle level divided into the section of high level, medium level and low level. In the case where the vehicle level is higher than a predetermined range of height, the high level detection sensor 21 outputs a signal "1" and the low level detection sensor 22 outputs a signal "0". In the case where the vehicle level is lower than the predetermined range of height, on the contrary, the high level detection sensor 21 outputs a signal "0" and the low level detection sensor 22 outputs a signal "1". In the case where the vehicle level is within the predetermined range of height, both of the detection sensors 21 and 22 output signals "0".

The outputs from the detection sensors 21 and 22 are connected to electromagnetic valve drive circuits 29 and 30 respectively by way of insensitive circuits 23 and 24 for temporary level change that render the control circuit inactive for instantaneous variations in the vehicle level. The drive circuits 29 and 30 open or close the valves 10 and 11 respectively. The circuits 23 and 24 are provided so that temporary level variations, e.g., joltings in the vehicle, if applied, may cause no effects on the signals outputted to the circuits 29 and 30. Thus, each of them outputs the signal "1" only when the high vehicle level signal "1" from the high level detection sensor 21 and the low vehicle level signal "1" from the low level detection sensor 22 are issued continuously for more than a predetermined period of time. On the contrary, each of them outputs the signal "0" instantly when the high level detection sensor 21 outputs the not-high level signal "0" and the low level detection sensor 22 outputs the not-low level signal "0". For instance, the circuit 23 may comprise a delay means that outputs the signal from the sensor 21 with a predetermined delay in time and an AND gate that detects the coincidence of the signals "1" from the sensor 21 and the delay means. The circuit 24 also has the same constitution. These circuits 23, 24 can be formed, for example, by the use of a timer as described above and by inputting inverted signal of the output signal of the timer and input signal of the timer in the AND gate respectively.

In the case where the high level detection sensor 21 is actuated to output the signal "1" and the circuit 23 supplies the signal "1" to the input of the circuit 29, the circuit 29 opens the valve 10, by which the operation described above in the mode (i) is effected. When the pressurized air is discharged from the air springs 3, 3, . . . to return the vehicle level within a predetermined range, the high level detection sensor 21 outputs the signal "0" and, as the result, the circuit 23 outputs the signal "0" and the circuit 29 closes the valve 10.

In the case where the vehicle level goes lower and the low level detection sensor 22 is actuated, the sensor 22 outputs the signal "1". Then, the signal "1" issued from the circuit 24 is sent to the circuit 30 causing it to open the valve 11, on one hand, and it is sent from the circuit 24 to the timer 25 on the other hand. The timer 25 outputs a signal "1" instantly upon reception of the signal "1" and continues to output the signal "1" till the elapse of a predetermined period of time set to the timer 25. The timer 25 can be formed by connecting two resisters and one condenser to IC of, for example, the type of MC 14541 of Motorola Co., and by combining an inverter with the said IC. Consequently, when the circuit 24 issues the signal "1", the timer 25 sends the signal "1" to one input 28a of an OR circuit 28 for the predetermined period of time and, as the result, the OR circuit 28 supplies a signal "1" to the electromagnetic valve drive circuit 31 causing it to open the valve 12. Now, since the valves 11 and 12 provided in the air conduit leading from the tank 8 to the springs 3, 3 are opened, the pressurized air is supplied from the tank 8 to the springs 3, 3. This is the operation as described above for the mode (ii)-(a). By the way, after the elapse of the "predetermined period of time", supply of pressurized air from the tank 8 to the air springs 3, 3 becomes less effective and the supply of pressurized air is conducted no more. In view of the above, the "predetermined period of time" is set to the timer 25 and the valve 12 is opened only for the set time.

In the case where the "predetermined period of time" has been elapsed and the vehicle level can not restore the predetermined height yet with all the supply of the pressurized air from the tank 8 to the air springs 3, 3 since the air supply only from the tank 8 is insufficient, the timer 25 outputs the signal "0". Then, the output signal from the OR circuit 28 to the circuit 31 turns to "0" to close the valve 12. In the case where the pressure of the air in the tank 8 goes lower before the elapse of the "predetermined period of time" and the low pressure sensor 9 is actuated, the drive circuit 32 is supplied with the signal "1" to actuate the compressor 7 and thereby supply the pressurized air to the springs 3, 3 which results in the operations as described above in (a) and (b) of the mode (ii) in parallel.

On the contrary, in the case where the vehicle level restores the height in the predetermined range by the supply of the pressurized air from the tank 8 within the time set to the timer 25, since the low level detection sensor 22 outputs the signal "0", the output circuit 30 closes the valve 11. Also, since the timer 25 instantly returns to output the signal "0", the circuit 31 closes the valve 12.

When the low pressure sensor 9 provided in the tank 8 is actuated by the reduction in the air pressure within the tank 8, the sensor 9 outputs the signal "1" and actuates the circuit 32 to start the operation of the compressor 7. In this case, if the actuation of the low pressure sensor 9 occurs within the time set to the timer 25, since the valve 12 is being opened as described above, pressurized air is supplied to the air springs 3, 3 both from the tank 8 and the compressor 7. Then, when the time set to the timer 25 has been elapsed, the valve 12 is closed and the pressurized air is supplied to the air springs 3, 3, . . . only from the compressor 7. This corresponds to the mode (ii)-(b).

In the case where the circuit 24 outputs the signal "1", since the signal "1" is inputted to NOT circuit or an inverter 26, it outputs a signal "0". Consequently, if the low pressure sensor 9 is actuated to output the signal "1", the AND circuit 27 is supplied at its one input 27a with the signal "0". Then, the AND circuit 27 supplies a signal "0" to the other input 28b of the OR circuit 28. Then, when the vehicle restores the predetermined level and the low level detection sensor 22 turns its output signal to "0", the NOT circuit 26 receives the signal "0" and outputs the signal "1", which is supplied to one input 27a of the AND circuit 27. Since the low pressure sensor 9 is still kept actuated then, the signal "1" is supplied also to the other input 27b of the AND circuit 27. As the result, the AND circuit 27 sends the signal "1" to the OR circuit 28 causing it to supply the signal "1" to the circuit 31 and thereby open the valve 12. The compressor 7 and the tank 8 are thus communicated by way of the air conduit 15 and the valve 12, through which the pressurized air is supplied from the compressor 7 to the tank 8. This corresponds to the operation described above for the mode (iii).

In the case where the pressurized air is charged to the tank 8 to raise the pressure therein and stop the actuation of the low pressure sensor 9, since the sensor 9 supplies the signal "0" to the circuit 32, the compressor 7 stops its operation. Simultaneously, since the signal to the input 27b of the AND circuit 27 turns "0", both of the signal from the AND circuit 27 to the OR circuit 28 and the signal from the OR circuit 28 to the circuit 31 turn respectively to "0", by which the valve 12 is closed.

What is claimed is:

1. A vehicle leveling system comprising a compressor, a receiver for accumulating the pressurized air produced from the compressor, and a pneumatic spring disposed between a chassis and a vehicle axle, and in which an air conduit from the compressor is connected to an air conduit communicating the receiver with the pneumatic spring, and the pressurized air is supplied from the the compressor only to the pneumatic springs after a predetermined period of time has been elapsed from the start of the supply of the pressurized air from the receiver to the pneumatic springs.

2. The vehicle leveling system of claim 1, in which two valves are disposed in the air conduit communicating the receiver with the pneumatic spring, one of the valves being disposed between the receiver and the compressor, the other of the valves being disposed between the compressor and the pneumatic spring, the supply of the pressurized air from the receiver to the pneumatic spring is conducted by the opening of both of the valves, the supply of the pressurized air from the compressor only to the pneumatic springs is conducted by the opening of one of the valves and closure of the other of the valves.

3. The vehicle leveling system of claim 1, which further comprises a timer, the predetermined period of time after the start of the supply of the pressurized air from the receiver to the pneumatic spring being specified by the timer.

4. The vehicle leveling system of claim 3, which further comprises a sensor for detecting the low level of the vehicle height, the timer conducting the timer action in response to the signal from the sensor for specifying the predetermined period of time.

5. A vehicle leveling system, comprising:
compression means for producing pressurized air;
means for accumulating the pressurized air produced by the compression means;
pneumatic spring means disposed between a chassis and a vehicle axle for setting the distance between the chassis and the vehicle axle by the pressurized air supplied thereto; and means for controlling the supply of the pressurized air so that the pressurized air to the pneumatic spring means from the compression means is supplied only to the pneumatic spring means after a predetermined period of time has elapsed from the start of the supply of the pressurized air from said accumulating means to the pneumatic spring means until a predetermined distance is set between the chassis and the vehicle axle,
the control means having a sensor for detecting the pressure of the pressurized air in the accumulating means, controlling the operation of the compression means in response to the detection signal from the sensor.

6. The vehicle leveling system of claim 5, in which the control means further has a valve disposed in a conduit communicating the compression means with the accumulating means for supplying the pressurized air from the compression means to the accumulating means, the valve being closed after the predetermined period of time has elapsed from the start of the supply of the pressurized air from the accumulating means to the pneumatic spring means until the predetermined distance is set between the chassis and the vehicle axle, thereby interrupting the communication of the compression means with the accumulating means by way of the conduit.

7. A vehicle leveling system comprising:
compression means for producing pressurized air;
means for accumulating the pressurized air produced by the compression means;
pneumatic spring means disposed between a chassis and a vehicle axle for setting the distance between the chassis and the vehicle axle by the pressurized air supplied thereto; and means for controlling the supply of the pressurized air so that the pressurized air from the compression means is supplied only to the pneumatic spring means after a predetermined period of time has elapsed from the start of the supply of the pressurized air from said accumulating means to the pneumatic spring means until a predetermined distance is set between the chassis and the vehicle axle, the control means having a sensor for detecting the low level of the vehicle height and a timer for conducting timer action in response to the signal from the sensor, the time set on the timer specifying said predetermined period of time.

8. The vehicle leveling system of claim 7, in which the control means further has a valve disposed in a conduit communicating the compression means with the accumulating means for supplying the pressurized air from the compression means for supplying the pressurized air from the compression means to the accumulating means, the valve being closed after the predetermined period of time has elapsed from the start of the supply of the pressurized air from the accumulating means to the pneumatic spring until the predetermined distance is set between the chassis and the vehicle axle, thereby interrupting the communication of the compression means with the accumulating means by way of the conduit.

9. A vehicle leveling system, comprising:
compression means for producing pressurized air;
means for accumulating the pressurized air produced by the compression means;
pneumatic spring means disposed between a chassis and a vehicle axle for setting the distance between the chassis and the vehicle axle by the pressurized air supplied thereto; and
means for controlling the supply of the pressurized air so that the pressurized air from the compression means is supplied only to the pneumatic spring means after a predetermined period of time has elapsed from the start of the supply of the pressurized air from said accumulating means to the pneumatic spring means until a predetermined distance is set between the chassis and the vehicle axle, the control means having a valve disposed in a conduit communicating the compression means with the accumulating means for supplying pressurized air from the compression means to the accumulating means, a sensor for detecting the low level of the vehicle height, and a timer for conducting timer action in response to the signal from the sensor, the valve being opened in response to the signal from the timer indicating that the timer is in operation.

10. The vehicle leveling system of claim 9, in which the valve is closed after the predetermined period of time has elapsed from the start of the supply of the pressurized air from the accumulating means to the pneumatic spring means until the predetermined distance is set between the chassis and the vehicle axle, thereby interrupting the communication of the compression means with the accumulating means by way of the conduit.

11. A vehicle leveling system, comprising:
compression means for producing pressurized air;
means for accumulating the pressurized air produced by the compression means;
pneumatic spring means disposed between the chassis and a vehicle axle for setting the distance between the chassis and the vehicle axle by the pressurized air supplied thereto; and
means for controlling the supply of the pressurized air so that the pressurized air from the compression means is supplied only to the pneumatic spring means after a predetermined period of time has elapsed from the start of the supply of the pressurized air from said accumulating means to the pneumatic spring means until a predetermined distance is set between the chassis and the vehicle axle, the control means having a first valve disposed in a conduit communicating the compression means with the accumulating means for supplying the pressurized air from the compression means to the accumulating means, a second valve disposed in a conduit communicating the compression means with the pneumatic spring means for supplying the pressurized air from the compression means to the pneumatic spring means, a sensor for detecting the low level of the vehicle height, and a timer for conducting timer action in response to the signal from the sensor, the first valve being opened in response to the signal from the timer indicating that the timer is in operation and the second valve being opened in response to the signal from the sensor.

12. The vehicle leveling system of claim 11, in which the first valve is closed after the predetermined period of time has been elapsed from the start of the supply of the pressurized air form the accumulating means to the pneumatic spring means until the predetermined distance is set between the chassis and the vehicle axle, thereby interrupting the communication of the compression means with the accumulating means by way of the conduit disposed with the first valve.

13. A vehicle leveling system, comprising:
compression means for producing pressurized air;
means for accumulating the pressurized air produced by the compression means;
pneumatic spring means disposed between a chassis and a vehicle axle for setting the distance between the chassis and the vehicle axle by the pressurized air supplied thereto; and
means for controlling the supply of the pressurized air so that the pressurized air from the compression means is supplied only to the pneumatic spring means after a predetermined period of time has elapsed from the start of the supply of the pressurized air from said accumulating means to the pneumatic spring means until a predetermined distance is set between the chassis and the vehicle axle, the control means having a valve disposed in a conduit communicating the compression means with the accumulating means for supplying the pressurized air from the compression means to the accumulating means, a first sensor for detecting the pressure of the pressurized air in the accumulating means, a second sensor for detecting the low level of the vehicle height, and a timer for conducting the timer action in response to the signal from the timer indicating that the timer is in operation, the valve being closed by the signal from the timer indicating the end of the timer action during the actuation period of the second sensor and the valve being opened in response to the signal from the first sensor during the not-actuation period of the second sensor.

14. The vehicle leveling system of claim 13, in which the valve is closed after the predetermined period of time has been elapsed from the start of the supply of the pressurized air from the accumulating means to the pneumatic spring means until the predetermined distance is set between the chassis and the vehicle axle, thereby interrupting the communication of the compression means with the accumulating means by way of the conduit.

15. The vehicle leveling system of claim 13, in which the compression means is driven in response to the signal from the first sensor.

16. The vehicle leveling system of claim 13, in which the response of the valve to the signal from the first sensor is inhibited during the actuation period of the second sensor.

17. A vehicle leveling system, comprising:
compression means for producing pressurized air;
means for accumulating the pressurized air produced by the compression means;
pneumatic spring means disposed between a chassis and a vehicle axle for setting the distance between the chassis and the vehicle axle by the pressurized air supplied thereto;
communicating means for communicating the compression means and the accumulating means with the pneumatic spring means;
means for controlling a supply of the pressurized air form the compression means and the accumulating means to the pneumatic spring means by way of the communicating means; and
the controlling means controlling the communicating means to interrupt the supply of the pressurized air from the accumulating means to the pneumatic spring means after the supply of the pressurized air from the accumulating means to the pneumatic spring means has continued for a predetermined period of time.

18. The vehicle leveling system of claim 17, in which the controlling means has a sensor producing a detection signal for detecting the pressure of the pressurized air in the accumulating means, the controlling means controlling the operation of the compression means in response to the detection signal from the sensor.

19. The vehicle leveling system of claim 17, in which the control means has a sensor for detecting the low level of the vehicle height, and a timer for conducting time action in response to the signal from the sensor, the timer being set to the time specifying said predetermined period of time.

20. The vehicle leveling system of claim 17, in which the controlling means has a valve through which the communicating means communicates the accumulating means with the pneumatic spring means, the valve being closed upon the interruption.

21. The vehicle leveling system of claim 17, in which the controlling means has a sensor for detecting the low level of the vehicle height, timer for conducting timer action in response to the signal from the sensor, the time set to timer specifying said predetermined period of time, and a valve through which the communicating means communicates the accumulating means with the pneumatic spring means, the valve being opened in response to the signal from the timer indicating that the timer is in operation and closed upon the interruption.

22. The vehicle leveling system of claim 17, in which the controlling means having a sensor for detecting the low level of the vehicle height, a timer for conducting timer action in response to the signal from the sensor, a first valve through which the communicating means communicates the accumulating means with the pneumatic spring means, the first valve being opened in response to the signal from the timer indicating that the timer is in operation and closed upon the interruption, and a second valve through which the communicating means communicates the compression means with the pneumatic spring means, the second valve being opened in response to the signal from the sensor.

23. The vehicle leveling system of claim 17, in which the controlling means having a first sensor for detecting the low level of the vehicle height, a second sensor for detecting the pressure of the pressurized air in the accumulating means, a timer for conducting the timer action in response to the signal from the first sensor, and a valve through which the communicating means communicates the accumulating means with the pneumatic spring means, the valve being opened in response to the signal from the timer indicating that the timer is in operation and being closed by the signal from the timer indicating the end of the action during the actuation period of the first sensor, the valve being opened in response to the signal from the second sensor during the not-actuation period of the first sensor.

* * * * *